(12) United States Patent
Bai et al.

(10) Patent No.: US 11,542,425 B1
(45) Date of Patent: Jan. 3, 2023

(54) LEAK-PROOF LOST-CIRCULATION CONTROL WATER-BASED DRILLING FLUID COMPOSITION AND PREPARATION METHOD AND USE THEREOF

(71) Applicant: Southwest Petroleum University, Chengdu (CN)

(72) Inventors: Yang Bai, Chengdu (CN); Lingfeng Wu, Chengdu (CN); Jing Zhang, Chengdu (CN); Wenzhe Li, Chengdu (CN); Pingya Luo, Chengdu (CN); Feng Dai, Chengdu (CN); Jingping Liu, Shandong (CN); Ren Wang, Chengdu (CN); Daoxiong Li, Chengdu (CN); Wen Xu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/727,063

(22) Filed: Apr. 22, 2022

(30) Foreign Application Priority Data

Feb. 24, 2022 (CN) .......................... 202210173339.6

(51) Int. Cl.
| | | |
|---|---|---|
| *C09K 8/516* | (2006.01) | |
| *C09K 8/508* | (2006.01) | |
| *E21B 21/00* | (2006.01) | |
| *C09K 8/24* | (2006.01) | |
| *C09K 8/16* | (2006.01) | |
| *C09K 8/504* | (2006.01) | |
| *C09C 1/02* | (2006.01) | |

(52) U.S. Cl.
CPC .............. *C09K 8/516* (2013.01); *C09C 1/021* (2013.01); *C09K 8/16* (2013.01); *C09K 8/24* (2013.01); *C09K 8/5045* (2013.01); *C09K 8/5086* (2013.01); *E21B 21/003* (2013.01)

(58) Field of Classification Search
CPC .... E21B 21/002; E21B 21/003; E21B 21/013; E21B 21/019; E21B 21/062; E21B 21/063; E21B 21/065; E21B 21/068; C09K 8/03; C09K 8/04; C09K 8/14; C09K 8/16; C09C 1/021
See application file for complete search history.

(56) References Cited

U.S. PATENT DOCUMENTS

2004/0009131 A1* 1/2004 Simonnet ............... A61K 8/064
424/63
2017/0362490 A1* 12/2017 Van Slyke ........... C10M 107/02
2019/0008749 A1* 1/2019 Harris .................. C10M 145/40

FOREIGN PATENT DOCUMENTS

WO   WO 2017/121675   *   2/2017   ............... C09C 1/02

* cited by examiner

*Primary Examiner* — Pegah Parvini
(74) *Attorney, Agent, or Firm* — Sughrue Mion, PLLC

(57) ABSTRACT

The present disclosure a leak-proof lost-circulation control water-based drilling fluid composition and preparation method and use thereof.

12 Claims, No Drawings

LEAK-PROOF LOST-CIRCULATION CONTROL WATER-BASED DRILLING FLUID COMPOSITION AND PREPARATION METHOD AND USE THEREOF

PRIORITY CLAIM & CROSS REFERENCE

The application claims priority to Chinese Application No. 202210173339.6, filed on Feb. 24, 2022, entitled "a leak-proof lost-circulation control water-based drilling fluid composition and preparation method and use thereof", which is herein specifically and entirely incorporated by reference.

FIELD

The present disclosure relates to the technical field of oil and gas well engineering drilling fluid, in particular to a leak-proof lost-circulation control water-based drilling fluid composition and a preparation method and a use thereof.

BACKGROUND

Lost circulation has persistently been an extremely troublesome technical problem in the process of drilling oil and gas wells in oil fields, and has severely restrained the progress of oil field exploration and development, an improper disposal of lost circulation will lead to accidents such as collapse of the borehole wall, sticking of drilling tool, overflow and blowout, or abandonment of a borehole, resulting in the environmental pollution, and in a serious circumstance, it may endanger personal safety and cause enormous economic loss and very abominable social impact.

Sand shale has the characteristics of strong water sensitivity and developed fractures, there is not filling in the fractures, and crisscrossing of the fractures, such that the mechanical strength of rock bodies is greatly weakened, together with the mechanical impact and friction shock caused by drill bits and other drilling tools during the process of drilling operations, and washing of the drilling fluid with a high flow rate, the lost circulation of oil wells is prone to occur. Moreover, during the conventional overbalanced drilling operation, the closed fractures are turned into the open fractures, the wellbore drilling fluid seeps through micro-fractures and pores to the formation under the influence of a pressure gradient, the decreased friction between the fractures and dissolving of filling in the fracture reduce the strength, the pore and fracture pressure of the formation increases, which in turn leads to an increase in the collapse pressure of the formation and accelerates the lost circulation of drilling fluid.

In sand shale, the plugging particles in the drilling fluid fail to effectively plug the fractures of formation may be one of the important causes of lost circulation.

Therefore, adjusting the properties of the drilling fluid, controlling the solid particles in the drilling fluid, plugging the fractures and pores in the lost circulation formation by reasonably utilizing the leak-proof lost-circulation control materials, and developing the leak-proof lost-circulation control drilling fluids suitable for drilling the sandstone formation are vital for improving the drilling efficiency and constructing the borehole rapidly and safely.

SUMMARY

The present disclosure serves to overcome the defective problem in the prior art with respect to the lost circulation caused by that the plugging particles in the drilling fluid cannot effectively plug fractures in the formation, and provides a leak-proof lost-circulation control water-based drilling fluid composition, and a preparation method and a use thereof, the water-based drilling fluid is capable of effectively plugging a sand shale fracture development formation.

In order to fulfill the above purpose, a first aspect of the present disclosure provides a method of preparing a modified calcium carbonate leak-proof lost circulation additive, including:

(1) contacting a purified calcium carbonate with a modifying agent to form a dispersion liquid;

(2) contacting the dispersion liquid with an activating agent to carry out a surface modification treatment, and subjecting the obtained mixture to a solid-liquid separation, drying and ultrasonic exfoliation treatment to produce a modified calcium carbonate leak-proof lost circulation additive;

wherein the modifying agent is polydimethylsiloxane, the activating agent is a fatty acid.

In a second aspect, the present disclosure provides a modified calcium carbonate leak-proof loss circulation additive produced with the aforesaid method.

In a third aspect, the present disclosure provides a leak-proof lost-circulation control water-based drilling fluid composition, comprising the aforesaid modified calcium carbonate leak-proof lost circulation additive, a follow-drilling lost circulation additive and a weighting agent, wherein the follow-drilling lost circulation additive has a particle size distribution of 30-120 mesh, the weighting agent has a particle size distribution of 200-400 mesh.

A fourth aspect of the present disclosure provides a use of the aforesaid leak-proof lost-circulation control water-based drilling fluid composition in drilling a shale sand fracture developing formation.

Due to the aforementioned technical scheme, compared to the lost circulation drilling fluid system in the existing art, the leak-proof lost-circulation control water-based drilling fluid used for the sand shale formation has the following advantages:

(1) The modified calcium carbonate leak-proof lost circulation additive plugging material in the drilling fluid system has a very small particle size, excellent dispersibility, and has been subjected to surface hydrophobicity modification, thus the plugging material can desirably suppress the hydration problem of sand shale, prevent the occurrence of phenomenon that the clay minerals absorb water and exhibit deteriorated strength due to the free water in the drilling fluid.

(2) A variety of lost circulation control particles of different particle sizes produce a synergistic effect to bridge, fill and plug fractures of the sand shale so as to form a dense plugging layer with extremely low permeability, thereby reducing the amount of lost circulation and water loss.

(3) The selected lost circulation material is the rigid particle with a high strength, which can enter the fractures more easily than the flaky material or strip material and is not crushed, and can mutually squeeze at the lost circulation fractures, enhance the extension stress and closure stress of the fractures, thereby improving the pressure-bearing capacity of the sand shale formation.

(4) The water-based drilling fluid of the present disclosure can effectively reduce the occurrence of sand shale hydration and lost circulation, and preventing loss circulation of drilling fluid or a serious downhole and complicated well accidents caused by the loss circulation. In addition, the drilling fluid of the present disclosure has desirable rheological property and rock-carrying capacity, the mud cake exhibits excellent quality. As regards fulfilling the purpose of performing leak-proof and lost-circulation control by plugging the fractures during the drilling process, the occurrence of fall-block of borehole wall and other accidents can be prevented. The water-based drilling fluid has positive effects of reducing treatment time of the lost circulation, keeping the formation stable and improving the efficiency of drilling well.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method of preparing a modified calcium carbonate leak-proof lost circulation additive, including:

(1) contacting a purified calcium carbonate with a modifying agent to form a dispersion liquid;

(2) contacting the dispersion liquid with an activating agent to carry out a surface modification treatment, and subjecting the obtained mixture to a solid-liquid separation, drying and ultrasonic exfoliation treatment to produce a modified calcium carbonate leak-proof lost circulation additive;

wherein the modifying agent is polydimethylsiloxane, the activating agent is a fatty acid.

The present inventors have found that subjecting a purified calcium carbonate to a surface modification treatment by using the method of the present disclosure results in that a modified calcium carbonate leak-proof loss circulation additive has a particle size distribution of 500-15,000 mesh, and exhibits the characteristics of very small particle size, excellent dispersibility and desirable hydrophobicity.

When drilling a sand shale fracture development formation, the drilling fluid of the present disclosure is able to perform an operation of follow-drilling lost circulation control in regard to the natural lost circulation fractures having an opening degree less than 2,000 μm. In the present disclosure, lost circulation of the drilling fluid can be prevented by using the follow-drilling lost circulation additive having a particle size distribution of 30-120 mesh for bridging and plugging the lost circulation layer during the drilling process, and using the weighting agent barite and other solid phase having a particle size distribution of 200-400 mesh in the drilling fluid for filling the bridging pores and fractures and reducing width of the fractures, and subsequently using the modified calcium carbonate powder having smaller particle size for continually carrying out plugging until the lost circulation channel is blocked; the particles in the lost circulation material have a particle size grading relationship, can increase the extension stress and closure stress in the lost circulation fractures of the lost circulation fractures under an effect of the stress cage, enhance the wellbore and borehole stress and pressure-bearing capacity of formation, further preventing lost circulation of the drilling fluid.

As for the fractures which have a width less than 100 μm and do not cause lost circulation, although the fractures do not trigger loss circulation directly during the drilling process, the fractures which do not cause lost circulation are more likely to open and expand so as to give rise to lost circulation, along with the increased depth of the drilling tool, constantly increased density of the drilling fluid, and mechanical external forces such as fluid column pressure. Therefore, the key of leak-proof and lost-circulation control is to introduce the plugging particles having suitable particle sizes, high strength and reasonable particle size grading into the drilling fluid so as to avoid lost circulation of the sand shale formation. The drilling fluid of the present disclosure is capable of effectively plugging a sand shale fracture development formation, blocking the lost circulation channel of the drilling fluid, forming a dense plugging layer in the formation fractures, preventing an opening and expanding of fractures due to the hydraulic wedge effect caused by an entrance of liquid phase into the formation.

According to the present disclosure, the modifying agent in step (1) is polydimethylsiloxane; preferably, the purified calcium carbonate is used in an amount of 5-10 g, more preferably 6-8 g, relative to 100 mL of the modifying agent. In the present disclosure, the aforementioned specific solvent is chosen so as to decorate a surface of calcium carbonate and perform modification.

According to the present disclosure, the activating agent in step (2) is used in an amount of 5-20 g, preferably 10-20 g, relative to 100 mL of the modifying agent; in a preferred circumstance of the present disclosure, an oleic acid is selected as the activating agent, the reason is that the molecules of oleic acid can be chemically bonded to molecules of calcium carbonate, which can form a single molecule active layer, and form a layer of film on the surface of calcium carbonate, so as to increase the inter-particle distance, and prevent agglomeration of calcium carbonate particles, enhance the degree of dispersion, thereby improving the dispersibility of calcium carbonate in an oily substrate.

In the present disclosure, the activating agent is one or more selected from the group consisting of stearic acid, oleic acid and cinnamic acid, preferably Oleic acid. Among them, oleic acid is one of the fatty acids, oleic acid is represented by the chemical formula $C_{18}H_{34}O_2$, it is a mono-unsaturated Omega-9 fatty acid.

According to the present disclosure, the conditions of the surface modification treatment comprise a temperature of 50-180° C. and a time of 2-6 hours, and preferably a temperature of 80-120° C. and a time of 3-5 hours. Preferably, the surface modification treatment is performed at the stirring rate is 500-900 r/min. In the present disclosure, if the temperature is too low, the modification effect is poor, and if the temperature is too high, the oleic acid has a high oxidization speed due to the high temperature, such that the modification effect is influenced.

According to the present disclosure, the solid-liquid separation is performed by means of washing and filtering. The purified water, tap water or deionized water may be used for washing.

According to the present disclosure, the drying conditions comprise a temperature of 60-100° C. and a time of 2-10 hours, preferably a temperature of 80-90° C. and a time of 3-8 hours.

According to the present disclosure, the conditions of the ultrasonic exfoliation treatment comprise an ultrasonic frequency of 3-4 MHz and a time of 50-70 min; preferably, an ultrasonic frequency of 3.5-4 MHz and a time of 50-60 min.

According to the present disclosure, the method further comprises: performing a purification treatment prior to the step (1), wherein the conditions of the purification treatment comprise: contacting a quick lime with hot water to perform a digestive treatment and obtain an emulsion; then subjecting the emulsion to a carbonization and drying treatment to obtain a purified calcium carbonate.

According to the present disclosure, the temperature of the hot water is 80-90° C.

According to the present disclosure, the conditions of the digestive treatment are not particularly limited, only if the digestive treatment is completed by contacting hot water with quick lime.

According to the present disclosure, the emulsion has a concentration of 10-20%.

According to the present disclosure, the conditions of the carbonization treatment comprise a temperature of 600-1200° C., preferably 800-1000° C., the carbonization treatment is terminated when a pH of the suspension is neutral, i.e., the pH is 7. Further, in the present disclosure, the carbonization treatment may be carried out in a carbonization tower by means of introducing carbon dioxide.

According to the present disclosure, the drying condition is not particularly limited, as long as the drying process can be performed. Preferably, the drying conditions comprise a temperature of 80-90° C. and a time of 3-5 hours.

In accordance with the present disclosure, quick lime is also known as burnt lime, its primary component is calcium oxide (CaO); the quick lime is typically prepared by calcinating a natural rock, which is mainly consisting of calcium carbonate, at high temperatures to decompose the calcium carbonate into carbon dioxide and calcium oxide.

According to the present disclosure, the modified calcium carbonate leak-proof lost circulation additive obtained by modification with the aforementioned method has excellent dispersibility, the particle surface is hydrophobic, thus can effectively prevent agglomeration between particles, and at the same time, the hydrophobic surface can prevent hydration of sand shale upon contacting with water during the process of plugging fractures of formation, and prevent loss circulation of the drilling fluid.

In a second aspect, the present disclosure provides a modified calcium carbonate leak-proof loss circulation additive prepared with the aforesaid method.

According to the present disclosure, the modified calcium carbonate leak-proof lost circulation additive has a particle size distribution of 500 to 15,000 mesh, preferably 600-10,000 mesh, more preferably 1,000-6,000 mesh, further preferably 1,500-5,500 mesh.

In a third aspect, the present disclosure provides a leak-proof lost-circulation control water-based drilling fluid composition, comprising the aforesaid modified calcium carbonate leak-proof lost circulation additive, a follow-drilling lost circulation additive and a weighting agent, wherein the follow-drilling lost circulation additive has a particle size distribution of 30-120 mesh, the weighting agent has a particle size distribution of 200-400 mesh.

According to the present disclosure, it is preferable that the follow-drilling lost circulation additive has a particle size distribution of 30-110 mesh, the weighting agent has a particle size distribution of 200-350 mesh; more preferably, the follow-drilling lost circulation additive has a particle size distribution of 30-100 mesh, the weighting agent has a particle size distribution of 300-330 mesh.

According to the present disclosure, the modified calcium carbonate leak-proof lost circulation additive is contained in an amount of 1-8 parts by weight, the follow-drilling lost circulation additive is contained in an amount of 1-8 parts by weight, and the weighting agent is contained in an amount of 80-300 parts by weight, relative to 100 parts by weight of water; it is preferable that the modified calcium carbonate leak-proof lost circulation additive is contained in an amount of 2-6 parts by weight, the follow-drilling lost circulation additive is contained in an amount of 2-6 parts by weight, and the weighting agent is contained in an amount of 100-200 parts by weight, relative to 100 parts by weight of water.

According to the present disclosure, the follow-drilling lost circulation additive is marble particle XNDL series, which refers to the calcium carbonate particle ground according to the particle size requirements, which has a specific gravity (the dimension of specific gravity is "1", i.e., no unit) of 2.7-2.8 and an appearance of white powder or particle, and plays the role of bridging and lost circulation control, thus it is a desirable lost circulation material, and it has high compressive strength and simple processing, and the follow-drilling lost circulation additive per se is an inert substance, and will not greatly affect properties of the drilling liquid after it is added into the drilling fluid. Preferably, the follow-drilling lost circulation additive is one or more selected from the group consisting of XNDL-B, XNDL-C and XNDL-D, wherein the XNDL-B, XNDL-C and XNDL-D have a particle size distribution within a range of 30-50 mesh, 50-80 mesh and 80-120 mesh, respectively. The acid solubility is greater than or equal to 92%.

In accordance with the present disclosure, the weighting agent is barite, i.e., ultra-fine barium sulfate.

According to the present disclosure, the water-based drilling fluid composition further comprises one or more selected from the group consisting of bentonite, an alkalinity modifying agent, an inhibitor, a filtrate reducer and an anti-collapse agent; preferably, the water-based drilling fluid further comprises bentonite, an alkalinity modifying agent, an inhibitor, a filtrate reducer and an anti-collapse agent.

According to the present disclosure, the content of bentonite is 3-6 parts by weight, the content of the alkalinity modifying agent is 0.1-1 parts by weight, the content of the inhibitor is 0.2-2 parts by weight, the content of the filtrate reducer is 2-6 parts by weight, and the content of the anti-collapse agent is 2-6 parts by weight, relative to 100 parts by weight of water; preferably, the content of bentonite is 2-4 parts by weight, the content of the alkalinity modifying agent is 0.1-0.8 parts by weight, the content of the inhibitor is 0.5-0.8 parts by weight, the content of the filtrate reducer is 3-4 parts by weight, and the content of the anti-collapse agent is 3-4 parts by weight, relative to 100 parts by weight of water.

According to the present disclosure, the bentonite is a smectite bentonite for drilling fluids, which is a non-metallic mineral containing smectite as the primary mineral component, and the smectite structure is a 2:1 type crystal structure composed of two Si—O tetrahedrons sandwiched by a layer of Al—O octahedra. The major role of smectite bentonite used in drilling fluids is to form a mud cake in water-based drilling fluids, and reduce filtrate loss and suspend drilling cuttings and barite.

In accordance with the present disclosure, the alkalinity modifying agent is potassium hydroxide.

According to the present disclosure, the inhibitor is hydrolyzed polyacrylamide POLYCAP, which is a linear polymer represented by the chemical formula $(C_3H_5NO)_n$. It is a hard glassy solid under the normal temperature, the product may be in the form of glue solutions, latexes and white powders, semi-transparent beads and flakes and the like. The inhibitor is thermally stable, and is soluble in water in any ratio and the aqueous solution is a homogeneous and transparent liquid. The inhibitor is used for stabilizing the water-sensitive formations, suppressing the hydration and dispersion of sand shale, and preventing mud drum. The hydrolyzed polyacrylamide POLYCAP inhibitor is a macromolecular hydrolyzed polyacrylamide (PHPA) liquid-phase product used for coating the drill cuttings and stabilizing the formations, while also serving to viscosify, flocculate, reduce drill bit mud drum and decrease filtrate loss. POLYCAP can rapidly adsorb hydrophilic solid phase to form a protective film, which functions to lubricate and reduce filtrate loss. POLYCAP is useful in both the soft dispersible formation and the hard brittle formation. The product is used in freshwater, seawater and monovalent brine systems suitable for the pH range of 8.5-10.5.

According to the present disclosure, the filtrate reducer is the lignite resin SPNH, which is the product obtained by condensation of some of the functional groups of lignite with phenolic resin. During the condensation reaction, some polymeric monomers or inorganic salts are used for grafting and crosslinking in order to improve the salt, calcium and temperature resistance of drilling fluid. The main function of SPNH is to reduce water loss, allow the system to maintain the desirable rheological property, salt resistance to 70,000 ppm, calcium resistance to 3,000 ppm; in addition, the lignite resin SPNH is not viscosified, has an obvious effect of resistance to high temperature and high pressure filtrate loss, and also serve to stabilize the borehole wall and reduce washout of the drilling fluid against the borehole wall.

According to the present disclosure the anti-collapse agent is sulfonated bitumen FT-1. It is a product obtained from the sulfonation of conventional asphalt using oleum or sulfur trioxide; the sulfonated asphalt introduces sulfonic acid group having very strong hydration property, such that the sulfonated asphalt is changed from water-insoluble to water-soluble. During the sulfonation process, it should control that the content of the water-soluble material is about 70% (mass fraction), and the content of water-soluble and oil-soluble fractions is about 30% (mass fraction). The sulfonated asphalt is black brown colloid or powder having a softening point above 80° C. and a density of about 1 g/cm$^3$. When the sulfonated asphalt is adsorbed on the cross-section of the sand shale crystal layer, the sulfonated asphalt can block the hydration and dispersion of the mineral particles and prevent collapse of the borehole wall; in addition, the water-insoluble fraction plays a plugging function of filling the pores and fractures, and improves the mud cake quality. The sulfonated asphalt can also function to performing lubrication and reducing the high temperature and high pressure filtrate loss in the drilling fluid.

According to a preferred embodiment of the present disclosure, a method of preparing a leak-proof lost-circulation control water-based drilling fluid composition including:

(S1) adding the required amount of bentonite to purified water or tap water at a temperature of 50-80° C. to obtain a mixed liquor 1;

(S2) adding the mixed liquor 1 obtained in step (S1) with the required amount of alkalinity modifying agent and stirring the mixture, adjusting pH of the system to 9-10 and pre-hydrating the system for 16-24 h to obtain a mixed liquor 2;

(S3) adding the mixed liquor 2 obtained in step (S2) with the required amount of an inhibitor, a filtrate reducer, a modified calcium carbonate leak-proof lost circulation additive, an anti-collapse agent, a follow-drilling lost circulation additive and a weighting agent sequentially under the stirring condition of 600-1,200 r/min, and uniformly blending the ingredients to prepare the leak-proof lost circulation control water-based drilling fluid.

A fourth aspect of the present disclosure provides a use of the aforesaid leak-proof lost-circulation control water-based drilling fluid composition in drilling a shale sand fracture developing formation.

According to the present disclosure, the drilled sand shale fracture development formation is a sand shale formation with a low pressure bearing capacity, a fracture development and an opening degree smaller than or equal to 2 mm.

The present disclosure will be described in detail below with reference to examples.

In the following Examples and Comparative Examples:

An electronic balance with a precision of 0.0001 g was purchased from the Shanghai Tianping Instrument Factory;

Bentonite was purchased from the Hebei Lingshou County Zhenhai Mineral Products Processing Factory in Shijiazhuang City, Hebei Province, with a product No. 14;

The alkalinity modifying agent potassium hydroxide was commercially available from the Chengdu Kelong Chemical Reagent Factory, with the product name KOH;

The filtrate reducer lignite resin was purchased from the Taiqian County Evergrande Chemical Co., Ltd. in Puyang City, Henan Province, with a model name SPNH;

The inhibitor hydrolyzed polyacrylamide was commercially available from Shake (Tianjin) Petroleum Technology Service Co., Ltd., with a product name POLYCAP;

The follow-drilling lost circulation additive XNDL series was purchased from Chengdu Jinniu Technology Co., Ltd. affiliated to the Southwest Petroleum University, with a model name XNDL;

The anti-collapse agent sulfonated asphalt was commercially available from Tianjin Chengli Chemical Co., Ltd., with a model name FT-1;

The oleic acid was purchased from Jinan Yingxin Chemical Co., Ltd., with a product number 20211025;

The quick lime was commercially available from Taicang Dongfang metallurgical lime products factory in Jiangsu Province, under the name calcium oxide;

The weighting agent barite was purchased from Shanghai Aladdin Biochemical Technology Co., Ltd., under the name of ultra-fine barium sulfate.

Preparation Example 1

The Preparation Example served to illustrate the preparation of the modified calcium carbonate leak-proof loss circulation additive of the present disclosure.

(1) The quick lime was digested with hot water at 60° C. to produce an emulsion with a concentration of 20%, the emulsion was pumped into a carbonization tower, carbon dioxide was introduced to carry out carbonization at a temperature of 900° C., the carbonization process was terminated when a pH of the suspension was equal to 7, the reaction product was subjected to drying at a high temperature of 80° C. for 3 h to obtain fine purified calcium carbonate particles;

(2) 10 g of purified calcium carbonate particles was taken and dispersed in 100 mL of polydimethylsiloxane to form a dispersion liquid;

(3) 20 g of oleic acid was introduced into the dispersion liquid under the condition of 80° C., the mixture was stirred at a stirring rate of 600 r/min and subjected to a reaction for 4 h, the obtained mixture was subjected to washing and separation, the separated modified calcium carbonate was placed in a blast oven and subjected to drying at 80° C. for 8 h; the obtained solids were subjected to an ultrasonic exfoliation with an ultrasonic frequency of 3.5 MHz for 60 min.

The prepared modified calcium carbonate leak-proof lost circulation additive was a white powder, which was insoluble in water and had a particle size distribution of 600-10,000 mesh.

Preparation Example 2

The Preparation Example served to illustrate the preparation of the modified calcium carbonate leak-proof loss circulation additive of the present disclosure.

(1) The quick lime was digested with hot water at 60° C. to produce an emulsion with a concentration of 15%, the emulsion was pumped into a carbonization tower, carbon dioxide was introduced to carry out carbonization at a temperature of 900° C., the carbonization process was terminated when a pH of the suspension was equal to 7, the reaction product was subjected to drying at a high temperature of 80° C. for 4 h to obtain fine purified calcium carbonate particles;

(2) 7.5 g of purified calcium carbonate particles was taken and dispersed in 100 mL of polydimethylsiloxane to form a dispersion liquid;

(3) 15 g of oleic acid was introduced into the dispersion liquid under the condition of 80° C., the mixture was stirred at a stirring rate of 600 r/min and subjected to a reaction for 4 h, the obtained mixture was subjected to washing and separation, the separated modified calcium carbonate was placed in a blast oven and subjected to drying at 80° C. for 8 h; the obtained solids were subjected to an ultrasonic exfoliation with an ultrasonic frequency of 3.5 MHz for 60 min.

The prepared modified calcium carbonate leak-proof lost circulation additive was a white powder, which was insoluble in water and had a particle size distribution of 1,000-6,000 mesh.

Preparation Example 3

The Preparation Example served to illustrate the preparation of the modified calcium carbonate leak-proof loss circulation additive of the present disclosure.

(1) The quick lime was digested with hot water at 60° C. to produce an emulsion with a concentration of 10%, the emulsion was pumped into a carbonization tower, carbon dioxide was introduced to carry out carbonization, the carbonization process was terminated when a pH of the suspension was equal to 7, the reaction product was subjected to drying at a high temperature of 800° C. to obtain fine purified calcium carbonate particles;

(2) 5 g of purified calcium carbonate particles was taken and dispersed in 100 mL of polydimethylsiloxane to form a dispersion liquid;

(3) 10 g of oleic acid was introduced into the dispersion liquid under the condition of 80° C., the mixture was stirred at a stirring rate of 600 r/min and subjected to a reaction for 4 h, the obtained mixture was subjected to washing and separation, the separated modified calcium carbonate was placed in a blast oven and subjected to drying at 80° C. for 8 h; the obtained solids were subjected to an ultrasonic exfoliation with an ultrasonic frequency of 4 MHz for 70 min.

The prepared modified calcium carbonate leak-proof lost circulation additive was a white powder, which was insoluble in water and had a particle size distribution of 1,500-5,500 mesh.

Example 1

The Example served to illustrate the preparation of a water-based drilling fluid of the present disclosure.

(S1) 100 parts by weight of tap water was taken and heated to 80° C., 4 parts by weight of bentonite was uniformly added with an electric stirring at a rotational speed of 600 r/min till the bentonite was sufficiently dispersed without agglomeration, such that a mixed liquor 1 was obtained;

(S2) 0.2 parts by weight of KOH was added into the mixed liquor 1 obtained in step (S1) to adjust the pH to 10, the mixture was subjected to stirring for 2 h and standing still for 24 h to obtain a mixed liquor 2;

(S3) The mixed liquor 2 obtained in step (S2) was sequentially added with 0.8 parts by weight of an inhibitor POLYCAP, added with 4 parts by weight of a filtrate reducer SPNH and stirred for 10 min, added with 4.0 parts by weight of an anti-collapse agent FT-1 and stirred for 10 min, and further added with 3 parts by weight of follow-drilling lost circulation additives XNDL-B, XNDL-C and XNDL-D having a particle size distribution of 30-120 mesh (wherein the XNDL-B, XNDL-C and XNDL-D were used in a weight ratio of 1:1:1) and stirred for 10 min, under an electric stirring at a rotational speed of 600 r/min; added with 4 parts by weight of the modified calcium carbonate leak-proof lost circulation additive prepared in the Preparation Example 1 and stirred by using a high speed stirrer at a rotational speed of 6,000 r/min for 10 min; then added with 120 parts by weight of a weighting agent barite having a particle size distribution of 300-330 mesh and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Example 2

The Example served to illustrate the preparation of a water-based drilling fluid of the present disclosure.

The water-based drilling fluid was prepared with the same method as that in Example 1, except that "the modified calcium carbonate leak-proof lost circulation additive prepared in the Preparation Example 1" was changed to "the modified calcium carbonate leak-proof lost circulation additive prepared in the Preparation Example 2".

The test results of the lost circulation control experiment for the water-based drilling fluid were shown in Table 1, and the test results of the High Temperature High Pressure (HTHP) filtrate loss were illustrated in Table 2.

Example 3

The Example served to illustrate the preparation of a water-based drilling fluid of the present disclosure.

The water-based drilling fluid was prepared with the same method as that in Example 1, except that "the modified calcium carbonate leak-proof lost circulation additive prepared in the Preparation Example 1" was changed to "the modified calcium carbonate leak-proof lost circulation additive prepared in the Preparation Example 3".

The test results of the lost circulation control experiment for the water-based drilling fluid were shown in Table 1, and the test results of the High Temperature High Pressure (HTHP) filtrate loss were illustrated in Table 2.

Example 4

The Example served to illustrate the preparation of a water-based drilling fluid of the present disclosure.

The water-based drilling fluid was prepared with the same method as that in Example 1, except that in step (S3), a mixed liquor 2 obtained in step (S2) was sequentially added with 0.8 parts by weight of an inhibitor POLYCAP, added with 4.0 parts by weight of a filtrate reducer SPNH and stirred for 10 min, added with 4.0 parts by weight of an anti-collapse agent FT-1 and stirred for 10 min, and further added with 2.0 parts by weight of follow-drilling lost circulation additives XNDL-B, XNDL-C and XNDL-D having a particle size distribution of 30-120 mesh (wherein the XNDL-B, XNDL-C and XNDL-D were used in a weight ratio of 1:1:1) and stirred for 10 min, under an electric stirring at a rotational speed of 600 r/min; added with 2.0 parts by weight of the modified calcium carbonate leak-proof lost circulation additive prepared in the Preparation Example 1 and stirred by using a high speed stirrer at a rotational speed of 6,000 r/min for 10 min; then added with 100 parts by weight of a weighting agent barite having a particle size distribution of 300-330 mesh and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Example 5

The Example served to illustrate the preparation of a water-based drilling fluid of the present disclosure.

The water-based drilling fluid was prepared with the same method as that in Example 1, except that in step (S3), a mixed liquor 2 obtained in step (S2) was sequentially added with 0.8 parts by weight of an inhibitor POLYCAP, added with 4.0 parts by weight of a filtrate reducer SPNH and stirred for 10 min, added with 4.0 parts by weight of an anti-collapse agent FT-1 and stirred for 10 min, and further added with 6.0 parts by weight of follow-drilling lost circulation additives XNDL-B, XNDL-C and XNDL-D having a particle size distribution of 30-120 mesh (wherein the XNDL-B, XNDL-C and XNDL-D were used in a weight ratio of 1:1:1) and stirred for 10 min, under an electric stirring at a rotational speed of 600 r/min; added with 6.0 parts by weight of the modified calcium carbonate leak-proof lost circulation additive prepared in the Preparation Example 1 and stirred by using a high speed stirrer at a rotational speed of 6,000 r/min for 10 min; then added with 200 parts by weight of a weighting agent barite and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Example 6

The Example served to illustrate the preparation of a water-based drilling fluid of the present disclosure.

The water-based drilling fluid was prepared with the same method as that in Example 1, except that in step (S3), a mixed liquor 2 obtained in step (S2) was sequentially added with 0.8 parts by weight of an inhibitor POLYCAP, added with 4.0 parts by weight of a filtrate reducer SPNH and stirred for 10 min, added with 4.0 parts by weight of an anti-collapse agent FT-1 and stirred for 10 min, and further added with 1.0 parts by weight of follow-drilling lost circulation additives XNDL-B, XNDL-C and XNDL-D having a particle size distribution of 30-120 mesh (wherein the XNDL-B, XNDL-C and XNDL-D were used in a weight ratio of 1:1:1) and stirred for 10 min, under an electric stirring at a rotational speed of 600 r/min; added with 1.0 parts by weight of the modified calcium carbonate leak-proof lost circulation additive prepared in the Preparation Example 1 and stirred by using a high speed stirrer at a rotational speed of 6,000 r/min for 10 min; then added with 80 parts by weight of a weighting agent barite and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Example 7

The Example served to illustrate the preparation of a water-based drilling fluid of the present disclosure.

The water-based drilling fluid was prepared with the same method as that in Example 1, except that in step (S3), a mixed liquor 2 obtained in step (S2) was sequentially added with 0.8 parts by weight of an inhibitor POLYCAP, added with 4.0 parts by weight of a filtrate reducer SPNH and stirred for 10 min, added with 4.0 parts by weight of an anti-collapse agent FT-1 and stirred for 10 min, and further added with 8.0 parts by weight of follow-drilling lost circulation additives XNDL-B, XNDL-C and XNDL-D having a particle size distribution of 30-120 mesh (wherein the XNDL-B, XNDL-C and XNDL-D were used in a weight ratio of 1:1:1) and stirred for 10 min, under an electric stirring at a rotational speed of 600 r/min; added with 8.0 parts by weight of the modified calcium carbonate leak-proof lost circulation additive prepared in the Preparation Example 1 and stirred by using a high speed stirrer at a rotational speed of 6,000 r/min for 10 min; then added with 240 parts by weight of a weighting agent barite and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Comparative Example 1

The water-based drilling fluid was prepared with the same method as that in Example 1, except that "the modified calcium carbonate leak-proof lost circulation additive prepared in the Preparation Example 1" was changed to "the modified calcium carbonate leak-proof lost circulation additive having a particle size distribution of 125-187.5 mesh".

The test results of the lost circulation control experiment for the water-based drilling fluid were shown in Table 1, and the test results of the High Temperature High Pressure (HTHP) filtrate loss were illustrated in Table 2.

Comparative Example 2

The water-based drilling fluid was prepared with the same method as that in Example 1, except that "the modified calcium carbonate leak-proof lost circulation additive prepared in the Preparation Example 1" was changed to "the unmodified calcium carbonate leak-proof lost circulation additive".

The test results of the lost circulation control experiment for the water-based drilling fluid were shown in Table 1, and the test results of the High Temperature High Pressure (HTHP) filtrate loss were illustrated in Table 2.

Comparative Example 3

The water-based drilling fluid was prepared with the same method as that in Example 1, except that "4 parts by weight of the modified calcium carbonate leak-proof lost circulation additive prepared in the Preparation Example 1" was changed to "0 part by weight of the modified calcium carbonate leak-proof lost circulation additive prepared in the Preparation Example 1".

The test results of the lost circulation control experiment for the water-based drilling fluid were shown in Table 1, and the test results of the High Temperature High Pressure (HTHP) filtrate loss were illustrated in Table 2.

Comparative Example 4

The water-based drilling fluid was prepared with the same method as that in Example 1, except that "added with 3 parts by weight of follow-drilling lost circulation additives having a particle size distribution of 30-120 mesh, added with 4 parts by weight of the modified calcium carbonate leak-proof lost circulation additive prepared in the Preparation Example 1 having a particle size distribution of 600-10,000 mesh, added with 120 parts by weight of a weighting agent barite having a particle size distribution of 300-330 mesh" was changed to "added with 3 parts by weight of follow-drilling lost circulation additive XNDL-O having a particle size distribution of 6-10 mesh".

The test results of the lost circulation control experiment for the water-based drilling fluid were shown in Table 1, and the test results of the High Temperature High Pressure (HTHP) filtrate loss were illustrated in Table 2.

Comparative Example 5

The water-based drilling fluid was prepared with the same method as that in Example 1, except that "added with 3 parts by weight of follow-drilling lost circulation additives having a particle size distribution of 30-120 mesh, added with 4 parts by weight of the modified calcium carbonate leak-proof lost circulation additive prepared in the Preparation Example 1 having a particle size distribution of 600-10,000 mesh, added with 120 parts by weight of a weighting agent barite having a particle size distribution of 300-330 mesh" was changed to "a weighting agent barite having a particle size distribution of 100-180 mesh".

The test results of the lost circulation control experiment for the water-based drilling fluid were shown in Table 1, and the test results of the High Temperature High Pressure (HTHP) filtrate loss were illustrated in Table 2.

Comparative Example 6

The water-based drilling fluid was prepared with the same method as that in Example 1, except that in step (S3), a mixed liquor 2 obtained in step (S2) was sequentially added with 0.1 parts by weight of an inhibitor POLYCAP, added with 1.0 parts by weight of a filtrate reducer SPNH and stirred for 10 min, added with 1.0 parts by weight of an anti-collapse agent FT-1 and stirred for 10 min, and further added with 1.0 parts by weight of follow-drilling lost circulation additive and stirred for 10 min, under an electric stirring at a rotational speed of 600 r/min; added with 0.5 parts by weight of the modified calcium carbonate leak-proof lost circulation additive prepared in the Preparation Example 1 and stirred by using a high speed stirrer at a rotational speed of 6,000 r/min for 10 min; then added with 50 parts by weight of a weighting agent barite and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Comparative Example 7

The water-based drilling fluid was prepared with the same method as that in Example 1, except that in step (S3), a mixed liquor 2 obtained in step (S2) was sequentially added with 2.4 parts by weight of an inhibitor POLYCAP, added with 8.0 parts by weight of a filtrate reducer SPNH and stirred for 10 min, added with 8.0 parts by weight of an anti-collapse agent FT-1 and stirred for 10 min, and further added with 10.0 parts by weight of follow-drilling lost circulation additive and stirred for 10 min, under an electric stirring at a rotational speed of 600 r/min; added with 10.0 parts by weight of the modified calcium carbonate leak-proof lost circulation additive prepared in the Preparation Example 1 and stirred by using a high speed stirrer at a rotational speed of 6,000 r/min for 10 min; then added with 300 parts by weight of a weighting agent barite and stirred for 10 min, such that the drilling fluid was prepared.

The test results of the lost circulation control experiment for the water-based drilling fluid were shown in Table 1, and the test results of the High Temperature High Pressure (HTHP) filtrate loss were illustrated in Table 2.

Test Example 1

500 mL of the prepared drilling fluids of Examples 1-7 and Comparative Examples 1-7 were taken respectively. The test of plugging fractures was performed by using a lost circulation instrument. The instrument in use was a DL lost circulation instrument, wherein the marbles in a lower part were removed, a cylindrical slot plate made of stainless steel was added, in which the fractures in the slot plate were wedge-shaped to simulate the cracks. The cylindrical plate had a thickness of 4 cm thick, and a wedge-shaped slot having a length of 2.5 cm long and a width of 2.0×1.5 mm was opened thereon to simulate a sand shale fracture development formation. The drilling fluid was poured into the instrument and covered with a seal-capping, and the lost circulation condition of the plugging drilling fluid was observed. The lost circulation amount was measured under a normal pressure, the pressure was increased to 0.5 MPa after 2 min and the time was recorded, the lost circulation condition was observed. If the drilling fluid did not leak or exhibited dropwise lost circulation, the pressure was further increased by 0.5 MPa after 2 min, the aforesaid steps were repeated, until the drilling fluid was completely leaked and the drilling fluid was pressurized to 3.5 MPa or 4.5 MPa, thereby selecting the best drilling fluid formulation.

TABLE 1

| Numbers | Lost circulation amount | Lost circulation control phenomenon |
|---|---|---|
| Example 1 | 48 | Lost circulation for 13 s and changed to filtrate loss, there was no lost circulation after the pressure was stabilized. |
| Example 2 | 35 | Lost circulation for 9 s and changed to filtrate loss, there was no lost circulation after the pressure was stabilized. |
| Example 3 | 27 | Lost circulation for 8 s and changed to filtrate loss, there was no lost circulation after the pressure was stabilized. |
| Example 4 | 50 | Initially showed a linear flow and then showed a trickling flow, the flow was stopped after 44 s. |
| Example 5 | 52 | Initially showed a linear flow and then showed a trickling flow, the flow was stopped after 45 s. |
| Example 6 | 55 | Initially showed a linear flow and then showed a trickling flow, the flow was stopped after 49 s. |
| Example 7 | 81 | Massive lost circulation, and showed a trickling flow after 35 s, and the flow was stopped after 53 s. |
| Comparative Example 1 | 109 | Massive lost circulation, and showed a trickling flow after 36 s, and the flow was stopped after 120 s. |
| Comparative Example 2 | 116 | Massive lost circulation, and showed a trickling flow after 42 s, and the flow was stopped after 76 s. |
| Comparative Example 3 | 500 | The drilling fluid was completely leaked, the flow was continuous. |
| Comparative Example 4 | 500 | The drilling fluid was completely leaked, the flow was continuous. |
| Comparative Example 5 | 500 | The drilling fluid was completely leaked, the flow was continuous. |
| Comparative Example 6 | 420 | Massive lost circulation, and showed a trickling flow after 110 s, and the flow was stopped after 120 s. |
| Comparative Example 7 | 231 | Massive lost circulation, and showed a trickling flow after 26 s, and the flow was stopped after 330 s. |

The data in Table 1 demonstrates the following content:

The lost circulation amount of drilling fluids in Examples 1-7 is within a range of 27-81 mL, the prepared leak-proof lost circulation additives have desirable plugging effect.

The lost circulation amount of each drilling fluid in Comparative Examples 1-7 is more than 100 mL, the drilling fluids fail to provide a desired plugging effect.

The leak-proof lost circulation additive of Comparative Example 2 is not subjected to modification treatment, it has a lost circulation amount of 116 mL, showing that the prepared leak-proof lost circulation additive has a great influence on the plugging capacity of the drilling fluid.

The leak-proof lost circulation additive in Comparative Example 3 is added in an amount of 0, the lost circulation amount is up to 500 mL, all the drilling fluid is leaked, it indicates that the drilling fluid system lacks the rigid bridging particles, and cannot form an effective plugging layer at the fracture, thus the plugging effect is very poor.

The follow-drilling lost circulation additives in Comparative Examples 4-5 have a particle size distribution of 6-10 mesh, and the barite has a particle size distribution of 100-180 mesh. The experimental results show an increased lost circulation amount, the results demonstrate that a particle size distribution of the follow-drilling lost circulation additive and the barite in the drilling fluid system directly affect its lost circulation control effect on the fractures.

The added amount of each treatment agent in Comparative Examples 6-7 does not fall into the claimed scope of the present disclosure, and the lost circulation control effect is poor.

Test Example 2

The drilling fluids prepared in Examples 1-7 and Comparative Examples 1-7 were taken respectively in an appropriate amount. The high-temperature and high-pressure filtrate loss amounts were tested by using a high-temperature and high-pressure filtrate loss meter, and the thickness of the mud cakes was measured, thereby reflecting the magnitude of the filtrate loss amounts and the plugging capacity of the drilling fluids and the quality of the formed mud cakes. The test temperature was 130° C. and the differential pressure was 3.5 MPa.

TABLE 2

| Numbers | Initial water loss | Total water loss | Thickness of mud cake |
|---|---|---|---|
| Example 1 | 1.8 | 12.4 | 2.2 |
| Example 2 | 1.6 | 11.8 | 2.0 |
| Example 3 | 1.6 | 10.2 | 1.8 |
| Example 4 | 2.0 | 12.6 | 2.3 |
| Example 5 | 2.2 | 13.8 | 2.3 |
| Example 6 | 2.4 | 14.4 | 2.5 |
| Example 7 | 2.4 | 14.8 | 2.5 |
| Comparative Example 1 | 3.6 | 16.0 | 3.4 |
| Comparative Example 2 | 2.8 | 15.8 | 3.6 |
| Comparative Example 3 | 3.0 | 16.6 | 4.2 |
| Comparative Example 4 | 2.8 | 15.8 | 3.5 |
| Comparative Example 5 | 3.4 | 18.0 | 4.2 |
| Comparative Example 6 | 3.4 | 16.8 | 4.2 |
| Comparative Example 7 | 3.4 | 15.0 | 4.0 |

As can be seen from the data in Table 2:

The high temperature and high pressure lost circulation amount and total water loss amount of the drilling fluids in Examples 1-7 are between 10.2-14.8 mL, and the thickness of mud cakes is between 1.8-2.5 mm. In order to ensure that the drilling fluids have a desirable plugging capacity in sand shale lost circulation formation, the lower is the water loss amount, the thinner is the mud cake, the better is the plugging capacity of the drilling fluids.

The high temperature and high pressure lost circulation amount and total water loss amount of the drilling fluids in each of the Comparative Examples 1-7 are larger than 15.0 mL, a thickness of each mud cake is greater than 3.0 mm, it demonstrates that the plugging effect of the drilling fluids is unsatisfactory.

To sum up, a leak-proof lost-circulation control water-based drilling fluid prepared in the present disclosure can be applied to a sand shale fractured lost circulation formation, the drilling fluid has a desired plugging capacity, prevents loss circulation of drilling fluid, improves the success rate of lost circulation control for once, and reduces the treatment time of complicated lost circulation.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method of preparing a modified calcium carbonate leak-proof lost circulation additive, including:
   (1) contacting a purified calcium carbonate with a modifying agent to form a dispersion liquid;
   (2) contacting the dispersion liquid with an activating agent to carry out a surface modification treatment, and subjecting the obtained mixture to a solid-liquid separation, drying and ultrasonic exfoliation treatment to produce a modified calcium carbonate leak-proof lost circulation additive;
   wherein the modifying agent is polydimethylsiloxane, the activating agent is a fatty acid.

2. The method of claim 1, wherein the purified calcium carbonate in step (1) is used in an amount of 5-10 g relative to 100 mL of the modifying agent.

3. The method of claim 1, wherein the activating agent is used in an amount of 5-20 g relative to 100 mL of the modifying agent.

4. The method of claim 1, wherein the activating agent in step (2) is one or more selected from the group consisting of stearic acid, oleic acid and cinnamic acid.

5. The method of claim 1, wherein the conditions of the surface modification treatment comprise a temperature of 50-80° C. and a time of 2-6 hours.

6. The method of claim 1, wherein the drying conditions comprise a temperature of 60-100° C. and a time of 2-6 hours;
   wherein the conditions of the ultrasonic exfoliation treatment comprise an ultrasonic frequency of 3-4 MHz and a time of 50-70 min.

7. The method of claim 1, wherein the preparation method further comprises: performing a purification treatment prior to the step (1), wherein the conditions of the purification treatment comprise: contacting a quick lime with hot water to perform a digestive treatment and obtain an emulsion; then subjecting the emulsion to a carbonization treatment and drying treatment to obtain a purified calcium carbonate.

8. The method of claim 7, wherein the temperature of hot water is 80-90° C.

9. The method of claim 7, wherein the emulsion has a concentration of 10-20%.

10. The method of claim 7, wherein the conditions of the carbonization treatment comprise: a temperature of 600-1200° C.

11. The method of claim 7, wherein the carbonization treatment is terminated when a pH of the suspension is neutral.

12. The method of claim 7, wherein the modified calcium carbonate leak-proof lost circulation additive has a particle size distribution of 500 to 15,000 mesh.

* * * * *